US007340268B2

(12) United States Patent
Oh et al.

(10) Patent No.: US 7,340,268 B2
(45) Date of Patent: Mar. 4, 2008

(54) RELIABILITY DETERMINATION AND COMBINING OF POWER CONTROL COMMANDS RECEIVED IN A WIRELESS COMMUNICATION SYSTEM

(75) Inventors: Hyukjun Oh, Santa Clara, CA (US); Parvathanathan Subrahmanya, Sunnyvale, CA (US); Nitin Kasturi, Los Gatos, CA (US); Messay Amerga, San Diego, CA (US); Chih-Ping Hsu, San Diego, CA (US); Christopher C. Riddle, San Diego, CA (US); Andrew Sendonaris, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 188 days.

(21) Appl. No.: 10/457,846

(22) Filed: Jun. 10, 2003

(65) Prior Publication Data

US 2004/0166884 A1 Aug. 26, 2004

Related U.S. Application Data

(60) Provisional application No. 60/450,603, filed on Feb. 26, 2003.

(51) Int. Cl.
*H04B 7/00* (2006.01)
*H04Q 7/20* (2006.01)
(52) U.S. Cl. .............. 455/522; 455/69; 455/67.11; 455/442; 370/320; 370/332; 370/335; 370/345
(58) Field of Classification Search .......... 455/522, 455/69, 67.11, 442; 370/335, 332, 320, 345

See application file for complete search history.

(56) References Cited

U.S. PATENT DOCUMENTS

| 6,269,239 | B1 | 7/2001 | Hashem et al. |
| 6,760,598 | B1 * | 7/2004 | Kurjenniemi ............... 455/522 |
| 2002/0082037 | A1 | 6/2002 | Salonaho et al. |
| 2004/0176038 | A1 * | 9/2004 | Luo et al. ................ 455/67.11 |

FOREIGN PATENT DOCUMENTS

| WO | WO0062440 | * | 4/2000 |
| WO | 0141485 | | 6/2001 |

* cited by examiner

*Primary Examiner*—Matthew D. Anderson
*Assistant Examiner*—Sujatha Sharma
(74) *Attorney, Agent, or Firm*—Thomas R. Rouse; George C. Pappas; Howard Seo

(57) ABSTRACT

The reliability of transmit power control (TPC) commands received from a transmitter is determined based on a TPC target value. The TPC target value is derived based on a TPC threshold and possibly a weight, depending on the receiver implementation. A received TPC command is considered reliable if its absolute value exceeds the TPC target value. Received TPC commands deemed as unreliable are discarded and not used for power control. Multiple TPC target values, used for detecting UP and DOWN commands, may be derived with multiple scaling factors. For a receiver in soft handover and receiving TPC commands from multiple transmitters, a different TPC target value may be derived for each transmitter. The received TPC commands for each transmitter are compared against that transmitter's TPC target value. Received TPC commands deemed as unreliable are discarded and not combined.

34 Claims, 7 Drawing Sheets

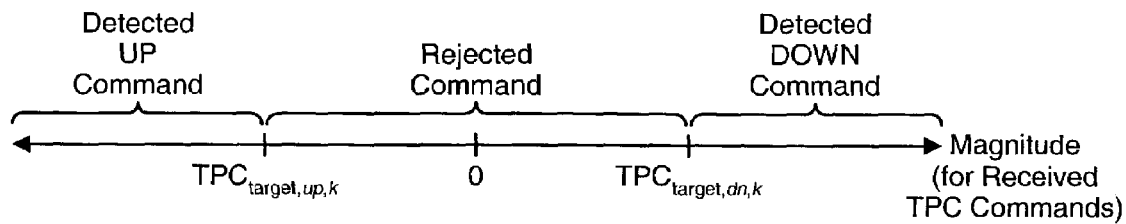
FIG. 6B
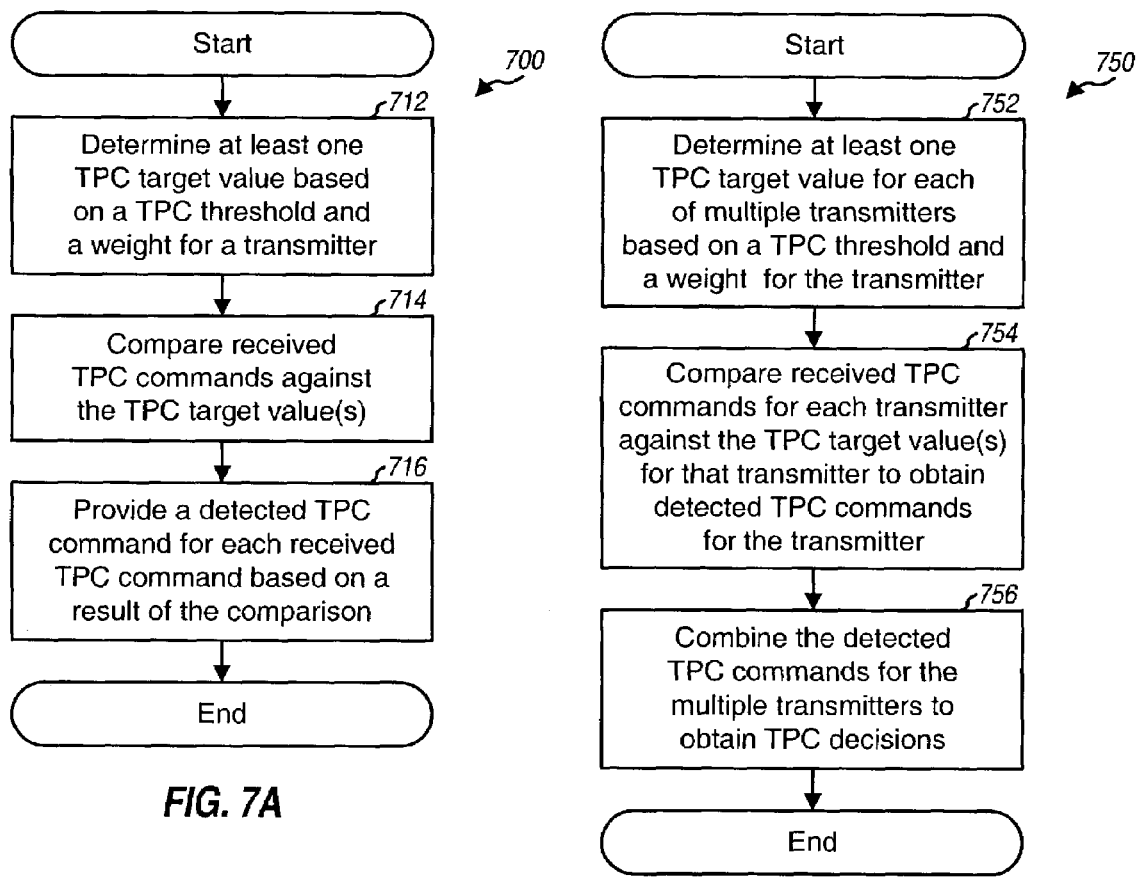
FIG. 7A
FIG. 7B

RELIABILITY DETERMINATION AND COMBINING OF POWER CONTROL COMMANDS RECEIVED IN A WIRELESS COMMUNICATION SYSTEM

RELATED APPLICATIONS

This application claims the benefit of provisional U.S. Application Ser. No. 60/450,603, entitled "TPC Combining in Soft Handover," filed Feb. 26, 2003, assigned to the assignee of the present application, and incorporated herein by reference in its entirety for all purposes.

BACKGROUND

1. Field

The present invention relates generally to communication, and more specifically to techniques for determining the reliability of transmit power control (TPC) commands received in a wireless communication system and for combining received TPC commands in soft handover.

2. Background

In a wireless communication system, a terminal (e.g., a cellular phone) communicates with one or more base stations via transmissions on the downlink and uplink. The downlink (i.e., forward link) refers to the communication link from the base stations to the terminal, and the uplink (i.e., reverse link) refers to the communication link from the terminal to the base stations. The downlink and uplink are typically allocated different frequency bands.

In a Code Division Multiple Access (CDMA) system, each base station may receive uplink transmissions from multiple terminals. Since these uplink transmissions occur over a shared frequency band, the transmission from each terminal acts as interference to the transmissions from other terminals. For each terminal, the interference due to other terminals degrades this terminal's received signal quality. (For simplicity, signal quality is quantified by a signal-to-interference ratio (SIR) in the following description.) Each terminal needs to maintain a particular SIR in order to achieve the desired level of performance, which may be quantified by a particular frame error rate (FER), packet error rate (PER), block error rate (BLER), or bit error rate (BER).

To maximize uplink capacity, an uplink power control mechanism is typically used to control the transmit power of each terminal. Conventionally, this power control mechanism includes an "inner" loop and an "outer" loop. The inner loop adjusts the transmit power of the terminal such that its received SIR, as measured at the base station, is maintained at a target SIR. This target SIR is often referred to as the "setpoint". The outer loop adjusts the target SIR to maintain the desired level of performance, which may be, for example, 1% BLER. The uplink power control mechanism thus attempts to reduce power consumption and interference while maintaining the desired link performance for the terminal.

Many CDMA systems support soft handover (i.e., soft handoff) on the uplink. Soft handover on the uplink refers to the reception of an uplink transmission from a terminal by multiple base stations. Soft handover provides diversity against deleterious path effects, such as fading and multi-paths, since multiple base stations at different locations are used to receive the uplink transmission. Soft handover may provide improved reliability for the uplink transmission from the terminal.

While a terminal is in soft handover on the uplink with multiple base stations, an inner loop is typically maintained by each of these base stations to adjust the terminal's transmit power. Conventionally, each base station determines the received SIR for the uplink transmission, generates TPC commands based on the received SIR and the target SIR, and transmits the TPC commands to the terminal. Each TPC command is either (1) an UP command to direct the terminal to increase its transmit power or (2) a DOWN command to direct the terminal to decrease its transmit power. Each base station independently generates TPC commands for the terminal based on the received SIR measured at that base station for the uplink transmission from the terminal.

While in soft handover, the terminal receives TPC commands from multiple base stations and determines whether each received TPC command is an UP command or a DOWN command. The terminal then conventionally applies the "OR-of-the-DOWN" rule for the TPC commands received from multiple base stations. For each power control period, this rule requires the terminal to decrease its transmit power if any one of the received TPC commands is determined to be a DOWN command.

The OR-of-the-DOWN rule works well if the terminal can reliably receive the TPC commands from all base stations. If the TPC commands from any base station are unreliably received, then the transmit power of the terminal will be biased downward or low. This is because UP commands sent by an unreliably received base station may be erroneously detected as DOWN commands by the terminal. This would then cause the terminal to decrease its transmit power regardless of the TPC commands received from more reliable base stations. The downward bias in transmit power can result in degraded performance (e.g., a higher BLER) for the terminal. In extreme instances, the downward bias can lead to a loss of the terminal's signal at the base stations.

Since the downward bias and higher BLER are undesirable, a requirement is often imposed such that only TPC commands received with sufficient reliability are combined by the OR-of-the-DOWN rule. Conventionally, the reliability of the received TPC commands for each base station is determined based on a pilot received from that base station. Each base station transmits its pilot at a fixed power level. If the received pilot strength (i.e., received pilot power) for a base station exceeds a pilot threshold, then that base station is considered to be received reliably and its TPC commands are combined by the OR-of-the-DOWN rule.

The use of received pilot strength to determine the reliability of received TPC commands is sub-optimal for several reasons. First, different transmit power levels may be used for the pilot and the TPC commands. The pilot is transmitted at a fixed power level while the TPC commands are transmitted at a power level determined by a downlink power control mechanism. If the TPC commands are transmitted at a low power level relative to the power level of the pilot, then the TPC commands may be unreliably received even if the pilot is strongly received. Second, if power balancing is not applied while in soft handover, then the ratio of TPC command power to pilot power may differ widely for different base stations. In this case, even if the received pilot strengths are the same for all base stations, the TPC commands will be received at different powers for different base stations. Thus, in certain circumstances, the reliability of the received TPC commands cannot be accurately determined based on the received pilot strength.

There is therefore a need in the art for techniques to more accurately determine the reliability of received TPC commands and to combine these received TPC commands in soft handover.

SUMMARY

Techniques for determining the reliability of TPC commands received from a transmitter (e.g., a base station) in a wireless communication system are provided herein. A received TPC command is considered reliable if its absolute value exceeds a TPC target value. The TPC target value may be derived based on a TPC threshold and possibly one or more scaling factors. The TPC threshold may be a function of various quantities (e.g., SIR, $E_c/I_o$, $E_c/N_t$, and so on) for one or more transmissions (e.g., TPC, pilot, and so on) received from the transmitter. ($E_c/N_t$ is an energy-per-chip-to-total-noise-and-interference ratio, and $E_c/I_o$ is an energy-per-chip-to-total-incoming-signal ratio.) The TPC threshold may be selected to trade off between false alarm and missed detection for the received TPC command. Depending on the implementation of the receiver, the TPC target value may also be derived based on a weight (e.g., a weighted $N_t/I_o$ estimate) so that the received TPC command can be compared directly against TPC target value. The TPC threshold and TPC target value and their derivation are described in detail below.

Each received TPC command is compared against the TPC target value to obtain a detected TPC command. Each detected TPC command may be a DOWN command, an UP command, or a "rejected" command. A detected TPC command is a rejected command if the received TPC command is considered to be unreliable, which may be the case if the absolute value of the received TPC command is less than the TPC target value. Rejected commands are not used for power control. Multiple TPC target values may be derived with multiple scaling factors, as also described below. One TPC target value may be used to determine whether the received TPC commands are UP commands, and another TPC target value may be used to determine whether the received TPC commands are DOWN commands.

Techniques for combining TPC commands received from multiple transmitters (e.g., base stations) in a wireless communication system are also provided herein. For a receiver (e.g., a terminal) in soft handover and receiving TPC commands from multiple transmitters, a different TPC target value may be determined for each transmitter. The received TPC commands for each transmitter are compared against the TPC target value for that transmitter to obtain detected TPC commands. The detected TPC commands for received TPC commands deemed as unreliable are discarded and not used for power control. The detected TPC commands for the multiple transmitters are combined to provide TPC decisions. For each power control period, the OR-of-the-DOWN rule may be applied to the detected TPC commands to obtain a TPC decision for that power control period. The TPC decision is (1) a DOWN command if any one of the detected TPC commands is a DOWN command, (2) a rejected command if all detected TPC commands are rejected commands, or (3) an UP command otherwise.

The techniques described herein may be used for any closed-loop power-controlled wireless communication system that sends TPC commands to control transmit power (e.g., CDMA systems). These techniques may be used for both the downlink and the uplink. Various aspects and embodiments of the invention are described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein:

FIG. 6B shows the use of separate UP and DOWN TPC target values to detect received TPC commands;

FIG. 7A shows a process for determining the reliability of received TPC commands; and FIG. 7B shows a process for detecting and combining received TPC commands.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

Figure 1:
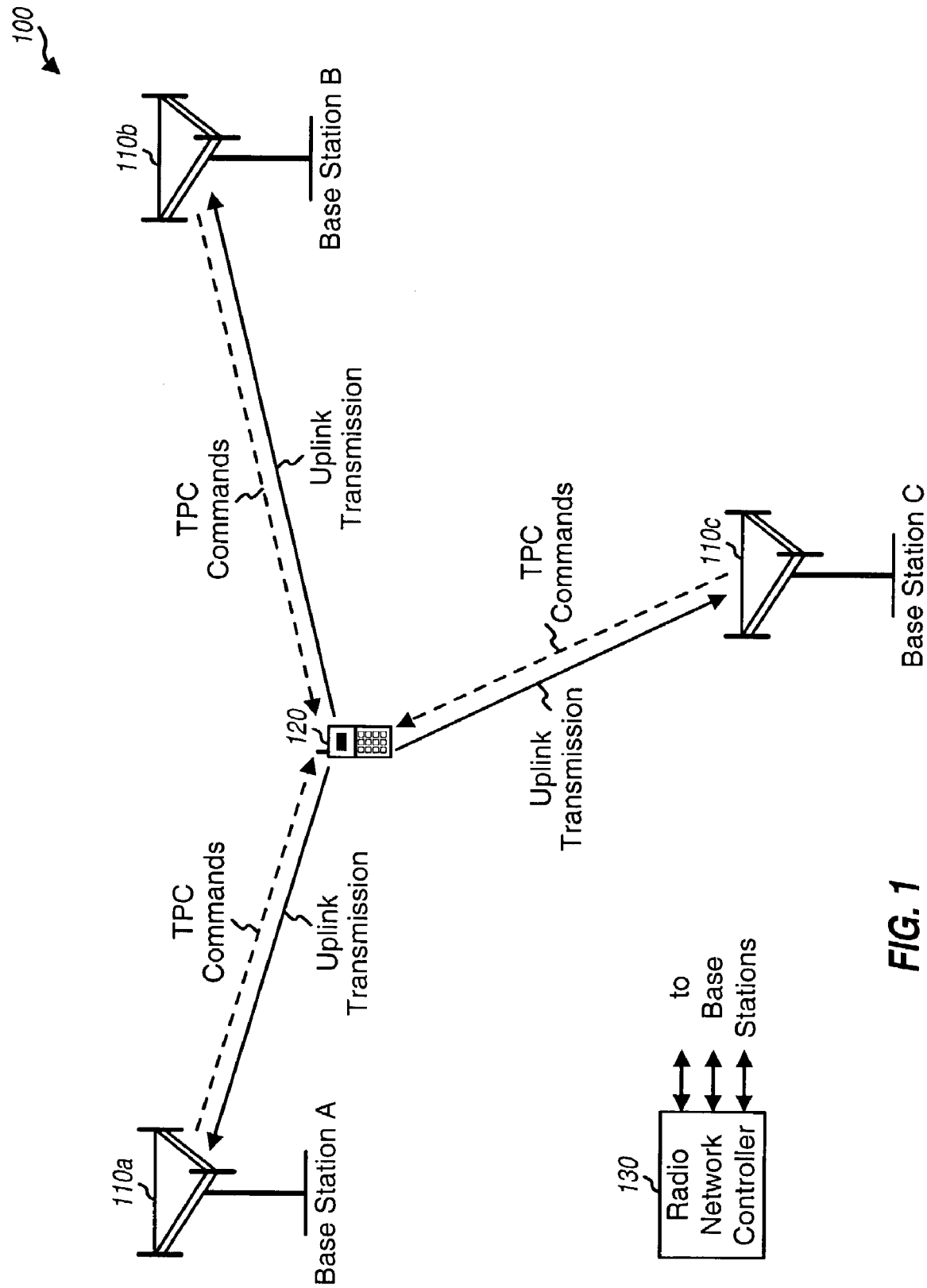
FIG. 1 shows a portion of a wireless communication system.

FIG. 1 shows a portion of a wireless communication system 100. For simplicity, only three base stations 110a, 110b, and 110c and one terminal 120 are shown in FIG. 1. A base station is a fixed station used for communicating with the terminals, and may also be referred to as a Node B, a base transceiver system (BTS), an access point, or some other terminology. A terminal may be fixed or mobile, and may also be referred to as a user equipment (UE), a mobile station, a remote station, an access terminal, or some other terminology.

A terminal may communicate with one or multiple base stations on the downlink and/or uplink at any given moment. This depends on whether or not the terminal is active, whether or not soft handover is supported, and whether or not the terminal is in soft handover. In FIG. 1, terminal 120 is in soft handover on the uplink, and its uplink transmission is received by all three base stations 110a, 110b, and 110c. Terminal 120 also receives TPC commands from all three base stations while in soft handover. These three base stations are included in an "active set" of the terminal.

A radio network controller (RNC) 130 couples to base stations 110a, 110b, and 110c and may further couple to other network entities. RNC 130 provides coordination and control for the base stations coupled to it. RNC 130 may also be referred to as a base station controller (BSC), a mobile switching center (MSC), or some other terminology.

The techniques described herein for determining the reliability of received TPC commands and for combining received TPC commands in soft handover may be implemented in various wireless communication systems. System 100 may thus be a CDMA system, a Time Division Multiple Access (TDMA) system, a Frequency Division Multiple Access (FDMA) system, or some other type of system. A CDMA system may implement one or more standards such as W-CDMA, IS-95, IS-2000, and IS-856. A TDMA system may implement one or more standards such as Global System for Mobile Communications (GSM). These standards are well known in the art. The techniques described herein may also be used for downlink as well as uplink power control. For clarity, these techniques are specifically described for uplink power control in an exemplary system, which is a CDMA system that implements W-CDMA (i.e., a W-CDMA system).

W-CDMA defines a channel structure capable of supporting multiple users concurrently and efficiently transmitting various types of data. In W-CDMA, data to be transmitted on the downlink to a particular terminal is processed as one or more "transport" channels at a higher signaling layer. The transport channels support concurrent transmission of different types of services (e.g., voice, video, packet data, and so on). The transport channels are then mapped to one or more "physical" channels, which are assigned to the terminal for a communication session (e.g., a call). In W-CDMA, a downlink dedicated physical channel (downlink DPCH) is typically assigned to each active terminal for the duration of a communication session. The downlink DPCH carries transport channel data and control data in a time-division multiplexed (TDM) manner.

Figure 2A:
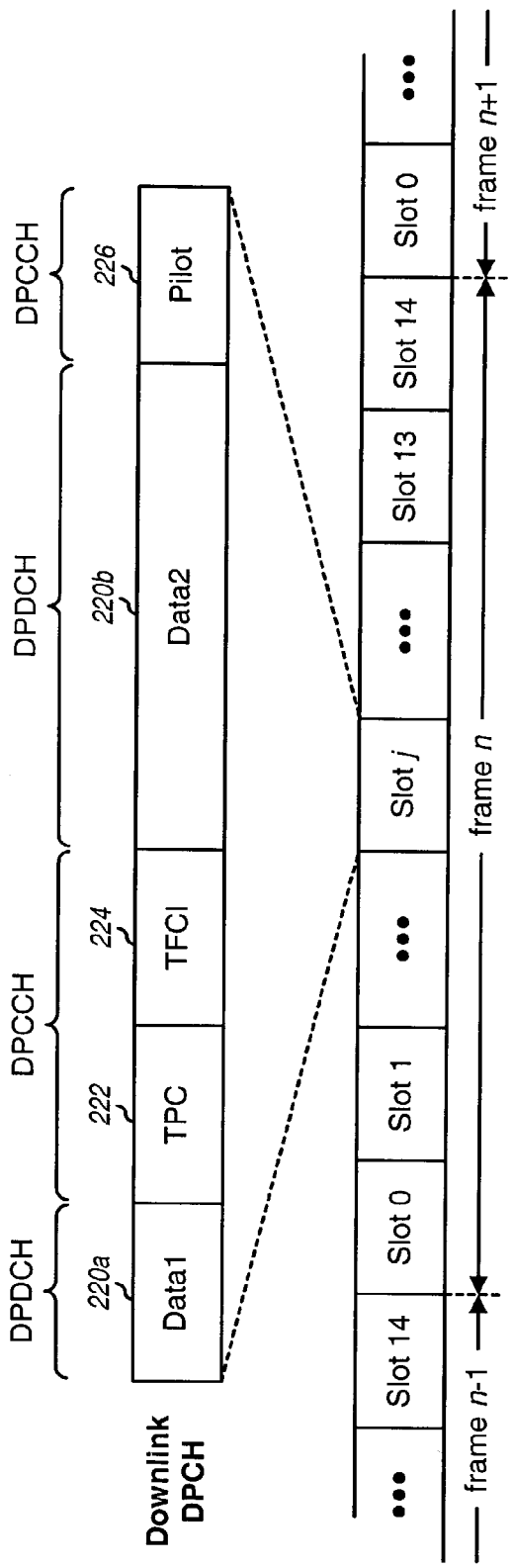
FIGS. 2A and 2B show the formats of a downlink dedicated physical channel (downlink DPCH) and a common pilot channel (CPICH) in W-CDMA.

FIG. 2A shows the format for the downlink DPCH in W-CDMA. Data is transmitted on the downlink DPCH in radio frames. Each radio frame is transmitted over a 10 msec frame, which is divided into 15 slots. Each slot is further partitioned into multiple fields for different types of data.

As shown in FIG. 2A, for the downlink DPCH, each slot includes data fields 220*a* and 220*b* (Data1 and Data2), a TPC field 222, a transport format combination indicator (TFCI) field 224, and a pilot field 226. Data fields 220*a* and 220*b* carry user-specific data. TPC field 222 carries a TPC command. TFCI field 224 carries the transport format for the downlink DPCH. Pilot field 226 carries a dedicated pilot for the terminal. The duration of each field in the downlink DPCH is determined by the slot format used for the downlink DPCH. One TPC command is sent in each slot in TPC field 222. TPC field 222 may have a duration of 2, 4, 8, or 16 bits, depending on the selected slot format.

As shown in FIG. 2A, the downlink DPCH is a multiplex of a downlink dedicated physical data channel (DPDCH) and a downlink dedicated physical control channel (DPCCH). The transport channel data is mapped to the DPDCH, while the DPCCH carries signaling information from a physical layer.

Figure 2B:
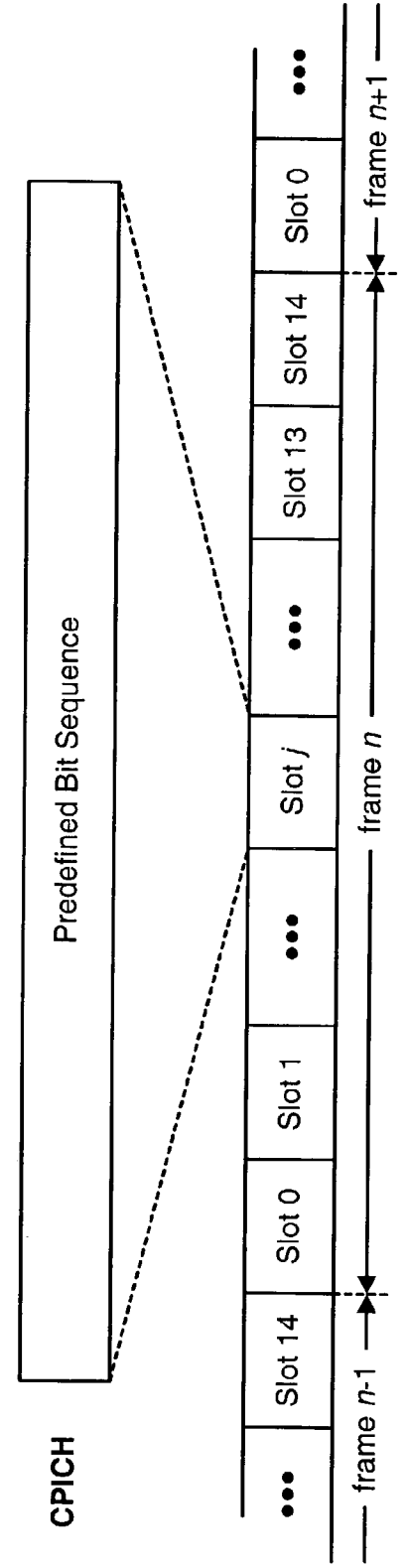

FIG. 2B shows the format for a common pilot channel (CPICH) in W-CDMA. The CPICH is a fixed rate (30 kbps) downlink physical channel that carries a predefined bit sequence. The CPICH is transmitted at a fixed power level.

In W-CDMA, each physical channel is assigned a different orthogonal variable spreading factor (OVSF) code. The OVSF code is used to "channelize" the data carried by the physical channel. The OVSF codes in W-CDMA are akin to the Walsh codes in IS-95 and IS-2000. An OVSF code of all zeros is used for the CPICH, and a non-zero OVSF code is assigned for the downlink DPCH. The downlink DPCH and CPICH are described in detail in a document 3GPP TS 25.211, which is publicly available.

Figure 3:
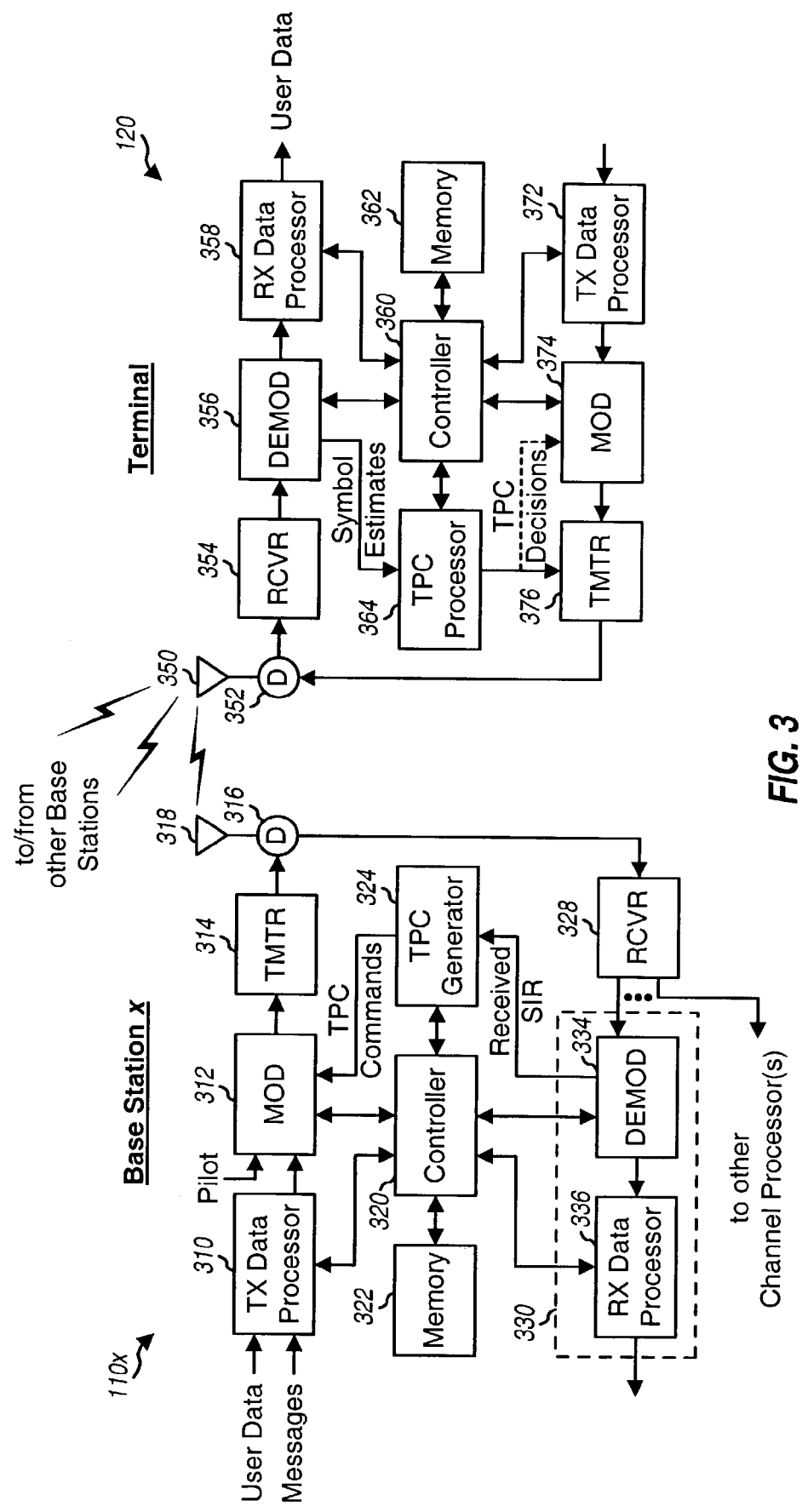
FIG. 3 shows a block diagram of a base station and a terminal.

FIG. 3 shows a block diagram of a base station 110*x* (which may be one of the base stations in FIG. 1) and terminal 120.

At base station 110*x*, for the downlink, a transmit (TX) data processor 310 receives, formats, and codes various types of traffic data (e.g., user-specific data, overhead data, and so on) based on one or more coding schemes to provide data symbols. A modulator (MOD) 312 then processes the data symbols and pilot symbols to provide a sequence of complex-valued chips. For W-CDMA, the processing by modulator 312 includes (1) channelizing (or "spreading") each data symbol for each physical channel with an OVSF code for that channel, (2) channelizing each pilot symbol with the pilot OVSF code, (3) combining the channelized data and pilot symbols for all physical channels, and (4) spectrally spreading (or "scrambling") the combined symbols with a scrambling sequence assigned to the base station to obtain the sequence of complex-valued chips. These chips are then provided to a transmitter unit (TMTR) 314 and conditioned (e.g., converted to one or more analog signals, amplified, filtered, and frequency upconverted) to generate a downlink signal. The downlink signal is then routed through a duplexer 316 and transmitted from an antenna 318 and over a wireless communication link to the terminals.

At terminal 120, the downlink signal(s) from one or multiple base stations are received by an antenna 350, routed through a duplexer 352, and provided to a receiver unit (RCVR) 354. Receiver unit 354 conditions (e.g., filters, amplifies, and frequency downconverts) the received signal and further digitizes the conditioned signal to provide a stream of data samples. A demodulator (DEMOD) 356, which may be implemented with a rake receiver, then processes the data samples to provide "recovered" symbols. For W-CDMA, the processing by demodulator 356 includes (1) descrambling the data samples with a descrambling sequence for the base station being recovered, (2) channelizing the descrambled samples with OVSF codes to segregate the received data symbols and pilot symbols onto their respective physical channels, and (3) coherently demodulating the received data symbols with pilot estimates to obtain the recovered symbols, as described below. A receive (RX) data processor 358 then decodes the recovered symbols to obtain the user-specific data and overhead data sent on the downlink.

The processing for an uplink transmission may be performed similarly to that described above for the downlink. The downlink and uplink processing for W-CDMA is described in documents 3GPP TS 25.211, 25.212, 25.213, and 25.214, all of which are publicly available.

Controllers 320 and 360 direct various operations at base station 110*x* and terminal 120, respectively. Memory units 322 and 362 store data and codes for controllers 320 and 360, respectively.

Figure 4:
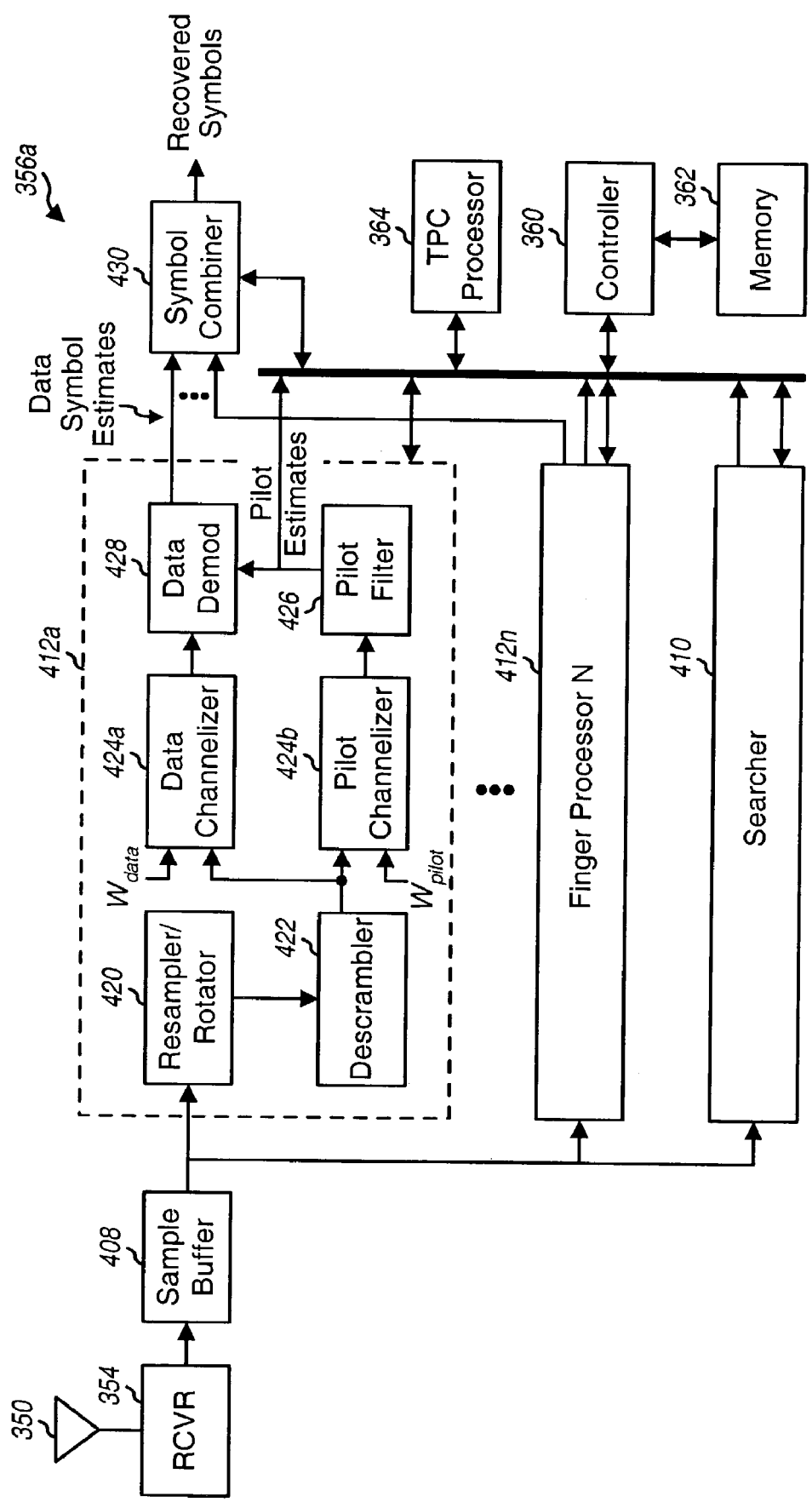
FIG. 4 shows a block diagram of a rake receiver.

FIG. 4 shows a block diagram of a rake receiver 356*a*, which is one embodiment of demodulator 356 in FIG. 3. Rake receiver 356*a* includes a sample buffer 408, a searcher 410, N finger processors 412*a* through 412*n* (where N>1), and a symbol combiner 430.

Receiver unit 354 processes the received signal from antenna 350 and provides a stream of data samples, which is stored in buffer 408. Buffer 408 thereafter provides the data samples to the appropriate processing units (e.g., searcher 410 and/or finger processors 412) at the appropriate time. Searcher 410 searches for strong signal instances (i.e., multipaths) in the received signal and provides the strength and timing of each found multipath that meets a set of criteria. The search processing is known in the art and not described herein.

Each finger processor 412 may be assigned to process a different multipath of interest (e.g., a multipath of sufficient strength). Within each finger processor 412, a resampler/rotator 420 performs resampling and phase rotation on the data samples to provide derotated samples at the proper chip rate and with the proper timing and phase. A descrambler 422 then multiplies the derotated samples with the descrambling sequence for the base station being recovered and provides descrambled samples.

To recover the pilot on the CPICH, a pilot channelizer 424b first multiplies the descrambled samples with the pilot OVSF code, $W_{pilot}$, and further accumulates the resultant samples for each time interval $T_{pilot}$ to obtain a received pilot symbol. $T_{pilot}$ is an integer multiple of the length of the pilot OVSF code. A pilot filter 426 then filters the received pilot symbols to provide pilot estimates for the CPICH.

To recover the data on the downlink DPCH, a data channelizer 424a first multiplies the descrambled samples with the OVSF code $W_{data}$ for the downlink DPCH and further accumulates the resultant samples over the length of this OVSF code to provide received data symbols. A data demodulator 428 then coherently demodulates the received data symbols with the pilot estimates to provide data symbol estimates. The pilot estimates are used as phase reference for the coherent demodulation.

The coherent demodulation may be performed with a dot product or a cross product. The dot product of the received data symbols and the pilot estimates may be expressed as:

$$Y^i(n) = D_I^i(n) \cdot P_I^i(n) + D_Q^i(n) \cdot P_Q^i(n), \qquad \text{Eq (1)}$$

where $D_I^i(n) + jD_Q^i(n)$ is a complex-valued received data symbol from data channelizer 424a of finger processor i for symbol period n;

$P_I^i(n) + jP_Q^i(n)$ is a complex-valued pilot estimate from pilot filter 426 of finger processor i for symbol period n; and $Y^i(n)$ is a real-valued data symbol estimate from finger processor i for symbol period n.

The cross product of the received data symbols and the pilot estimates may be expressed as:

$$Y^i(n) = D_I^i(n) \cdot P_Q^i(n) - D_Q^i(n) \cdot P_I^i(n). \qquad \text{Eq (2)}$$

Symbol combiner 430 receives and combines the data symbol estimates from all finger processors assigned to process each base station and provides final data symbol estimates (i.e., recovered symbols) for that base station. If multiple base stations are being processed (e.g., in soft handover), then symbol combiner 430 provides a stream of recovered symbols for each base station. Coherent demodulation and symbol combining are also described in U.S. Pat. Nos. 5,764,687 and 5,490,165.

On the uplink, the capacity of each base station is limited by the total power received by the base station. To maximize uplink capacity, the transmit power of each terminal is typically controlled to be as low as possible to reduce interference while maintaining the desired level of performance. This level of performance is denoted by a target BLER (e.g., of 1%) in the following description.

Figure 5:
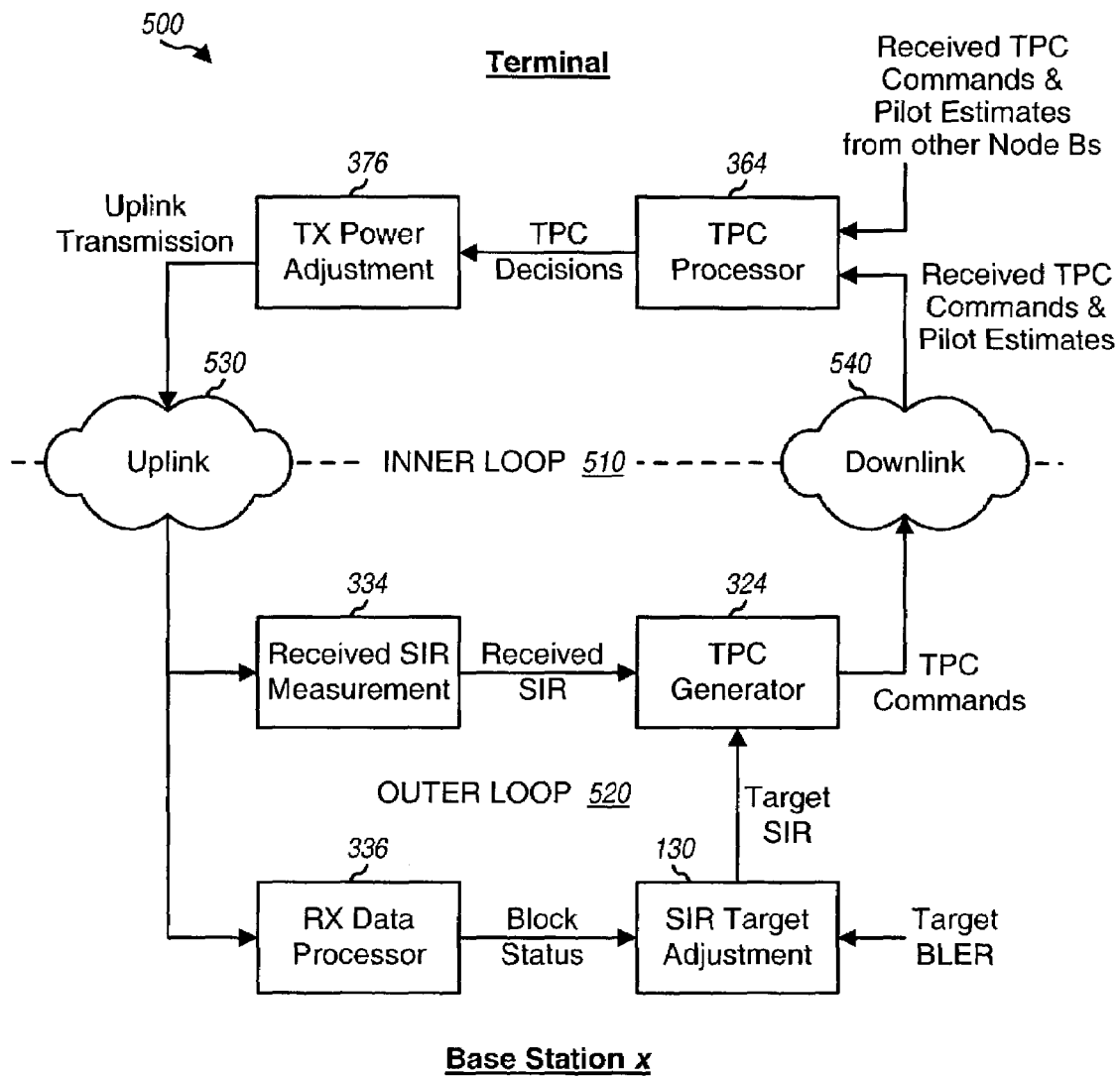
FIG. 5 shows an uplink power control mechanism.

FIG. 5 shows an uplink power control mechanism 500, which includes an inner loop 510 and an outer loop 520. For a terminal in soft handover and communicating with multiple base stations (i.e., node Bs, in W-CDMA terminology), one inner loop 510 is maintained by each base station for the terminal. A single outer loop 520 is maintained for the terminal by a network entity, e.g., RNC 130. FIG. 5 also shows various processing units in base station 110x and terminal 120 that make up the inner and outer loops. (Not all processing units are shown in FIG. 5 for simplicity.)

For each base station, inner loop 510 attempts to maintain the received SIR for the uplink transmission, as measured at that base station, as close as possible to a target SIR. Inner loop 510 performs power adjustment by: (1) estimating the received SIR for the uplink transmission (in a demodulator 334 at base station 110x, see FIG. 3), (2) comparing the received SIR against the target SIR (in a TPC generator 324 at base station 110x), (3) generating TPC commands based on the results of the comparison (also in TPC generator 324), and (4) sending the TPC commands to the terminal via the downlink (cloud 540). Each TPC command is either an UP command to direct an increase in transmit power or a DOWN command to direct a decrease in transmit power. One TPC command is sent in each slot in W-CDMA.

The terminal processes the downlink transmissions received from the base stations in its active set. For each slot, the terminal processes the DPCCH for each base station to obtain a received TPC symbol, which is an estimate of the TPC command sent by that base station. Each received TPC symbol is a "soft-decision" symbol (i.e., a multi-bit value) that comprises (1) a hard-decision value ("0" or "1") for the TPC command sent by the base station plus (2) channel noise and other distortions. For each slot, the terminal combines the received TPC symbols for all base stations in the active set to obtain a single TPC decision for that slot (in a TPC processor 364 at terminal 120). The terminal then adjusts its uplink transmit power accordingly based on the TPC decision (in a transmitter unit 376 at terminal 120). For W-CDMA, the TPC commands may be sent as often as 1500 times per second, thus providing a relatively fast response time for inner loop 510.

Due to path loss and fading on the uplink (cloud 530), which typically varies over time and especially for a mobile terminal, the received SIR at each base station continually fluctuates. For each base station, inner loop 510 attempts to maintain the received SIR at or near the target SIR in the presence of changes in the uplink.

Outer loop 520 continually adjusts the target SIR such that the target BLER is achieved for the uplink transmission. A single outer loop 520 may be maintained for the terminal by RNC 130. The uplink transmission from the terminal is received and decoded by each base station to recover the transmitted data blocks, and the status of each decoded data block is determined (by an RX data processor 336 in base station 110x). For each decoded data block, a determination is made whether the data block was decoded correctly (good) or in error (erased) or not transmitted at all (DTX). The status of each decoded data block (good, erased, or DTX) is then sent to RNC 130. RNC 130 selects certain ones of the decoded data blocks and adjusts the target SIR accordingly based on the status of the selected data blocks. Typically, if a data block is decoded correctly, then the received SIR at the base stations is likely to be higher than necessary, and the target SIR is reduced slightly. Conversely, if a data block is decoded in error, then the received SIR at the base stations is likely to be lower than necessary, and the target SIR is increased. The target SIR may be maintained fixed if RNC 130 detects that no data blocks were transmitted.

The performance of the uplink power control is dependent on the terminal's ability to accurately detect the TPC commands sent by the base stations. Conventionally, the terminal determines whether or not each base station is reliably received based on the received pilot strength measured at the terminal for that base station. If a base station is deemed to be reliable, then the received TPC commands for the base station are used by the inner loop for power control. This method of determining the reliability of received TPC commands based on received pilot strength may be inaccurate for the reasons given above.

The reliability of the received TPC commands is determined by the received SIR for the TPC commands (i.e., the TPC SIR). The TPC SIR for W-CDMA may be expressed as:

$$TPC\ SIR = \frac{1}{2} \cdot N_{TPC} \cdot SF \cdot \frac{TPC\ E_c/I_o}{N_t/I_o}, \qquad \text{Eq (3)}$$

where $N_t/I_o$ is the total-noise-and-interference-to-total-incoming-signal ratio;
TPC $E_c/I_o$ is the received signal strength for the TPC commands;
SF is the spreading factor for the OVSF code (i.e., the OVSF code length) for the downlink DPCH; and
$N_{TPC}$ is the number of TPC bits in a slot. The term $E_c$ denotes the energy-per-chip for a data or pilot symbol. The term $N_t$ denotes the total noise and interference power (i.e., without the desired signal). The term $I_o$ denotes the total incoming signal power at the input of receiver unit 354. $I_o$ is typically a fixed value that is determined by the design of the receiver unit. Since $I_o$ is a fixed value, $N_t/I_o$ is simply the squared magnitude of noise and interference, and TPC $E_c/I_o$ is the squared magnitude of the received TPC commands.

The slot format indicates various configurable transmission parameters for the downlink DPCH, such as the number of bits transmitted for each TPC command ($N_{TPC}$) and the spreading factor for the downlink DPCH. These configurable parameters are used to obtain the proper scaling in the computation of the TPC SIR. The terms SF and $N_{TPC}$ may be accounted for by a scaling factor in equation (3).

In one specific receiver implementation, the following quantities are computed by the terminal:

$$A = k_1 \cdot CPICH\ E_c/I_o \cdot N_t/I_o, \text{ and} \qquad \text{Eq (4)}$$

$$B = k_2 \cdot \sqrt{CPICHE_c/I_o} \cdot N_{TPC} \cdot SF \cdot \sqrt{TPCE_c/I_o}, \qquad \text{Eq (5)}$$

where CPICH $E_c/I_o$ is the received pilot strength for the CPICH;
A is a weighted $N_t/I_o$ estimate computed for each finger processor;
B is the value of the received TPC command from the symbol combiner; and
$k_1$ and $k_2$ are two fixed-value constants determined by the receiver design.

The TPC SIR may be computed using the quantities A and B, as follows:

$$TPC\ SIR = \frac{k_3 \cdot B^2}{N_{TPC} \cdot SF \cdot A}, \qquad \text{Eq (6)}$$

where $k_3 = 0.5 k_1/k_2^2$. In equations (3) through (6), the multiplication and division by $N_{TPC} \cdot SF$ can be performed with simple shift operations because this quantity has a power-of-two value (i.e., $N_{TPC} \cdot SF = 2^z$, where z is a positive integer).

The TPC SIR may be computed as shown in equation (6) for each received TPC command and used to determine the reliability of the received TPC command. If the TPC SIR for a given received TPC command is sufficiently high (i.e., exceeds a TPC SIR threshold), then the received TPC command is deemed as reliable and used for power control. Conversely, if the TPC SIR for the received TPC command is low (i.e., falls below the TPC SIR threshold), then the received TPC command is deemed as unreliable and discarded. The TPC SIR threshold is typically a static value that is selected based on a tradeoff between probability of false alarm and probability of missed detection, as described below.

It may not be convenient to compute the TPC SIR explicitly as shown in equation (6). Some simplifications may be made. For example, the quantity $B^2$ may be compared against a TPC target value, which is equal to the product $N_{TPC} \cdot SF \cdot A \cdot k_3^{-1}$ times the TPC SIR threshold. This implementation avoids the need for a divide operation. Other simplifications may also be made, as described below.

Equation (6) may be rewritten as:

$$\frac{B}{\sqrt{A}} = k_4 \cdot \sqrt{N_{TPC} \cdot SF} \cdot \sqrt{TPC\ SIR} \qquad \text{Eq (7)}$$
$$= k_a \cdot \sqrt{TPC\ SIR}$$
$$= TPC_{th},$$

where $k_4 = 1/\sqrt{k_3}$, $k_a = k_4 \cdot \sqrt{N_{TPC} \cdot SF}$, and $TPC_{th}$ is a TPC threshold (which is typically a static value). The quantity $B/\sqrt{A}$ may be computed for each received TPC command and compared against the TPC threshold. Again, to avoid a divide operation, the quantity B may be compared against a TPC target value, which may be defined as:

$$TPC_{target} = \sqrt{A} \cdot TPC_{th}. \qquad \text{Eq (8)}$$

The TPC target value may be viewed as a weighted or dynamic TPC threshold, where $\sqrt{A}$ is the weight. The weight $\sqrt{A}$ is proportional to $\sqrt{CPICHE_c/I_o} \cdot \sqrt{N_t/I_o}$, which is the weighted $N_t/I_o$ estimate, as shown in equation (4). The use of the TPC target value avoids the need to explicitly compute the TPC SIR. The reliability of the received TPC commands may be determined by performing simple comparison between the received TPC commands and the TPC target value.

A received TPC command for a given base station is considered reliable if the absolute value of the received TPC command exceeds the TPC target value. The reliability of each received TPC command is individually determined based on the TPC command itself and the TPC target value. For a terminal in soft handover, a different TPC target value may be derived for each base station based on the $\sqrt{CPICHE_c/I_o} \cdot \sqrt{N_t/I_o}$ measured at the terminal for that base station.

The TPC threshold, $TPC_{th}$, may also be defined in some other manners. In a first alternative embodiment, the TPC threshold is defined as:

$$TPC_{th} = K_b \cdot \sqrt{TPCSIR}, \qquad \text{Eq (9)}$$

where $K_b$ is a scaling factor that is not a function of $N_{TPC} \cdot SF$.

In a second alternative embodiment, the TPC threshold is defined as:

$$TPC_{th} = K_c \cdot \sqrt{CPICHE_c/I_o} \cdot \sqrt{TPCSIR}, \qquad \text{Eq (10)}$$

where $K_c$ is a scaling factor.

In a third alternative embodiment, the TPC threshold is defined as:

$$TPC_{th} = K_d \cdot CPICH\ E_c/I_o \cdot TPC\ SIR, \qquad \text{Eq (11)}$$

where $K_d$ is a scaling factor.

In a fourth alternative embodiment, the TPC threshold is defined as:

$$TPC_{th} = K_e \cdot \sqrt{CPICHE_c/I_o} \cdot \sqrt{TPCE_c/N_t}, \quad \text{Eq (12)}$$

where $K_e$ is a scaling factor.

In a fifth alternative embodiment, the TPC threshold is defined as:

$$TPC_{th} = K_f \cdot \sqrt{OTHER\_DPCCH\_FIELDE_c/N_t}, \quad \text{Eq (13)}$$

where OTHER_DPCCH_FIELD $E_c/N_t$ is the $E_c/N_t$ of the TFCI, the dedicated pilot, or a combination of any DPCCH symbols, and $K_f$ is a scaling factor.

In general, the TPC threshold may be a function of SIR, $E_c/N_t$, $E_c/I_o$, $N_t/I_o$, or some other quantity for one or more transmissions. The transmission may be a common pilot (e.g., the CPICH), the received TPC commands, the data symbols received on a physical or code channel used for the TPC commands, a dedicated pilot (e.g., in the DPCCH, as show in FIG. 2A), or some other transmission.

The TPC threshold may be determined based on a tradeoff between the probability of false alarm and the probability of missed detection. A higher TPC threshold results in lower likelihood of false alarm and higher likelihood of missed detection. A false alarm occurs when an incorrectly received TPC command is deemed to be reliable and used for power control. False alarm is less likely to occur if the TPC threshold is high. A missed detection occurs when a correctly received TPC command is deemed to be unreliable and discarded. Missed detection is more likely to occur if the TPC threshold is high. The TPC threshold may be selected to trade off between the probability of false alarm and the probability of missed detection. If the TPC threshold is based on TPC SIR, and since the computation of TPC SIR is dependent on the slot format as shown in equation (7), the scaling factor $K_a$ in equation (7) may be a function of slot format. However, it can be shown that a fixed value for the scaling factor $K_a$ (i.e., not a function of slot format, as shown in equation (9)) can provide good performance and simple implementation.

In equation (8), the TPC target value is computed based on a weight $\sqrt{CPICHE_c/I_o} \cdot \sqrt{N_t/I_o}$, which is proportional to $\sqrt{A}$. The specific weight to use for the TPC target value may be dependent on the manner in which the received TPC commands are obtained. For example, the weight $\sqrt{CPICHE^c/I_o} \cdot \sqrt{N_t/I_o}$ is used in equation (8) because the received TPC commands are obtained based on coherent demodulation of the received data symbols with the pilot estimates. The weight allows the received TPC commands to be compared directly against the TPC target value, and avoids the need for a division by $\sqrt{A}$ as described above. For other receiver implementations, the weight may be a function of some other quantities, or may even be omitted altogether. The specific weight to use for the TPC target value may also be dependent on the manner in which various types of data are transmitted. For example, if the TPC commands are transmitted at a known power offset from the CPICH, then the TPC target value may be computed based on the received signal strength for the CPICH. The specific weight to use for the TPC target value may also be dependent on other factors.

Figure 6A:
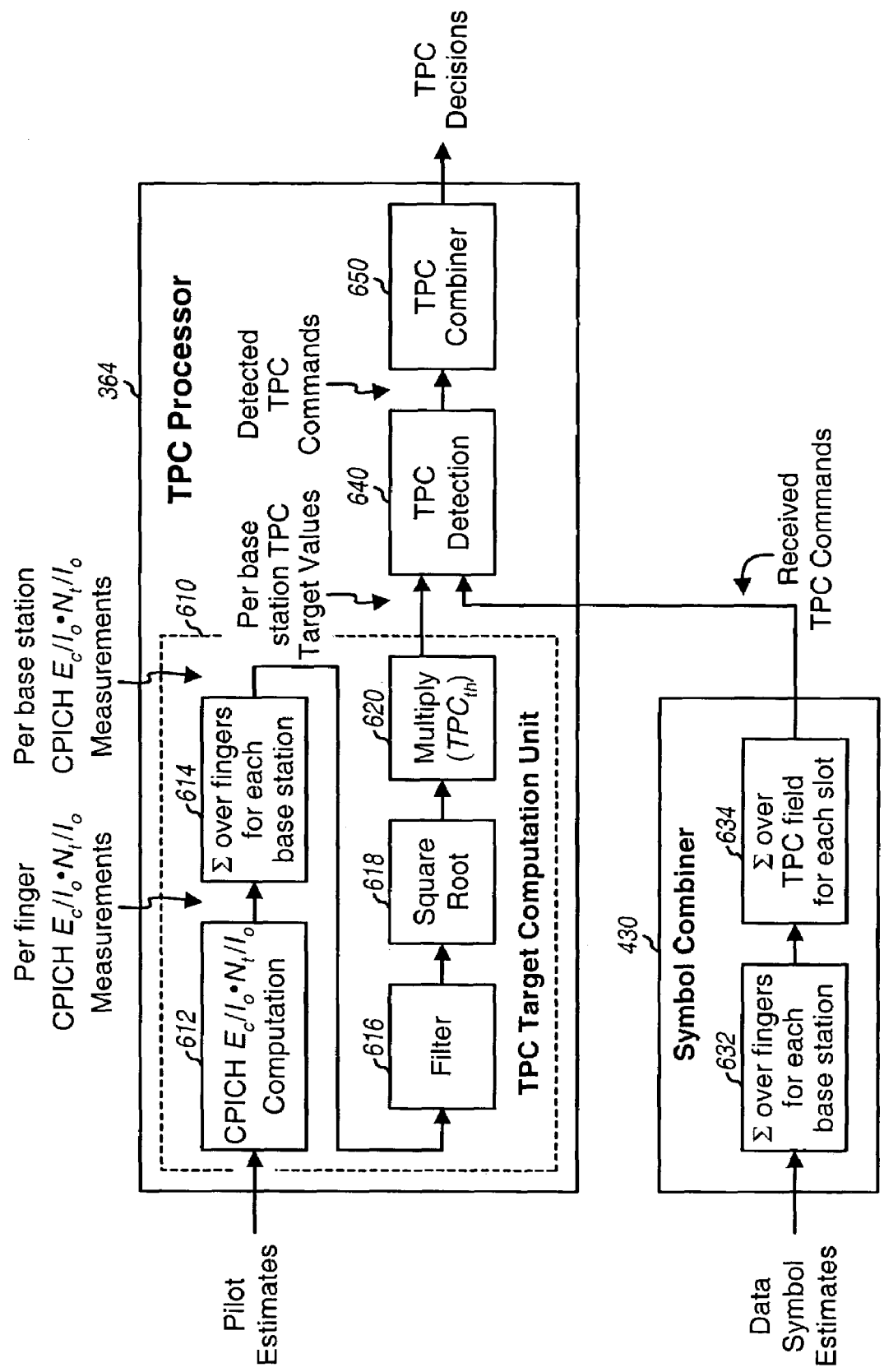
FIG. 6A shows a block diagram of a TPC processor.

FIG. 6A shows a block diagram of an embodiment of TPC processor 364 within terminal 120. TPC processor 364 includes a TPC target computation unit 610, a TPC detection unit 640, and a TPC combiner 650.

Within computation unit 610, the pilot estimates for the CPICH for all assigned finger processors are provided to a computation unit 612, which computes the CPICH $E_c/I_o \cdot N_t/I_o$ for each finger processor. The quantity $(CPICH\ E_c/I_o)_i$ for finger processor i may be obtained as the power of the pilot estimates, which is $(CPICH\ E_c/I_o)_i = P_I^i(n)^2 + P_Q^i(n)^2$. The quantity $N_t/I_o$ may be obtained by (1) computing a pilot difference as $\Delta P^i(n) = P^i(n) - P^i(n-1)$, where $P^i(n) = P_I^i(n) + jP_Q^i(n)$, (2) computing the pilot difference power as $\|\Delta P^i(n)\|^2$, and (3) filtering the pilot difference power to obtain $N_t/I_o$. Unit 612 then multiplies $(CPICH\ E_c/I_o)_i$ for each finger processor with $N_t/I_o$ to obtain $(CPICH\ E_c/I_o \cdot N_t/I_o)_i$ for that finger processor.

Unit 612 may further filter the $(CPICH\ E_c/I_o \cdot N_t/I_o)_i$ values for each finger processor. If a finger processor has just been assigned, then its filtered values may take some time to settle. In the interim period, a small value may be used instead of the filtered values. This small value ensures that the output from a newly assigned finger processor is not combined right away with the outputs from other finger processors. This is the desired result if the new finger processor is assigned to a weak multipath, and marginally affects performance if the new finger processor is assigned to a strong multipath.

A summing unit 614 then receives and sums the filtered or unfiltered $(CPICH\ E_c/I_o \cdot N_t/I_o)_i$ values for all finger processors assigned to each base station to obtain a $(CPICH\ E_c/I_o \cdot N_t/I_o)_k$ value for that base station. This summing may be expressed as:

$$(CPICH\ E_c/I_o \cdot N_t/I_o) = \sum_{i \in S_k} (CPICH\ E_c/I_o \cdot N_t/I_o)_i, \quad \text{Eq (14)}$$

where $S_k$ denotes the set of all finger processors assigned to process base station k.

A filter 616 then filters the $(CPICH\ E_c/I_o \cdot N_t/I_o)_k$ values for each base station to obtain filtered values for that base station. Filter 616 may implement a finite impulse response (FIR) filter, an infinite impulse response (IIR) filter, or some other filter structure. A unit 618 then takes the square root of the filtered $(CPICH\ E_c/I_o \cdot N_t/I_o)_k$ values to obtain the quantity $(\sqrt{CPICHE_c/I_o} \cdot \sqrt{N_t/I_o})_k$, which is $\sqrt{A_k}$. A unit 620 then multiplies the output of unit 618 with a TPC threshold, $TPC_{th,k}$, and one or more scaling factors (e.g., $K_{up}$ and $K_{dn}$) to obtain one or more TPC target values for the base station. In one embodiment, a single TPC target value is used for the detection of both UP and DOWN commands. This single TPC target value may be computed as:

$$TPC_{target,k} = K_{up/dn} \cdot TPC_{th,k} \cdot (\sqrt{CPICHE_c/I_o} \cdot \sqrt{N_t/I_o})_k, \quad \text{Eq (15)}$$

where $TPC_{target,k}$ is the TPC target value for base station k;
$TPC_{th,k}$ is the TPC threshold for base station k; and
$K_{up/dn}$ is a scaling factor used to compute the TPC target value.

In another embodiment, separate TPC target values are used for the detection of UP and DOWN commands. These TPC target values may be computed as:

$$TPC_{target,up,k} = K_{up} \cdot TPC_{th,k} \cdot (\sqrt{CPICHE_c/I_o} \cdot \sqrt{N_t/I_o})_k, \quad \text{and Eq (16)}$$

$$TPC_{target,dn,k} = K_{dn} \cdot TPC_{th,k} \cdot (\sqrt{CPICHE_c/I_o} \cdot \sqrt{N_t/I_o})_k,$$

where $TPC_{th,k}$ is the TPC threshold for base station k;
$TPC_{target,up,k}$ is the UP TPC target value for base station k;
$TPC_{target,dn,k}$ is the DOWN TPC target value for base station k;

$K_{up}$ is a scaling factor used to compute the UP TPC target value; and $K_{dn}$ is a scaling factor used to compute the DOWN TPC target value.

The UP and DOWN TPC target values are used to detect for UP and DOWN commands, respectively, sent by the base stations.

FIG. 6A also shows an embodiment of symbol combiner 430. A summing unit 632 receives and sums the data symbol estimates from all finger processors assigned to each base station to obtain the final data symbol estimates for that base station. This summing may be expressed as:

$$Y_k(n) = \sum_{i \in S_k} Y^i(n), \quad \text{Eq (17)}$$

where $Y_k(n)$ is the final data symbol estimate for base station k for symbol period n.

A summing unit 634 then accumulates the final data symbol estimates obtained for each base station during the TPC field in each slot (see FIG. 2A) to provide a received TPC command for that base station for that slot. This accumulation may be expressed as:

$$TPC_{rx,k} = \sum_{n \in N_{TPC}} Y_k(n), \quad \text{Eq (18)}$$

where $TPC_{rx,k}$ is the received TPC command for base station k.

Summing units 632 and 634 may also be swapped in FIG. 6A. In this case, the received TPC command for base station k may be obtained by (1) accumulating the data symbol estimates for each finger processor over the TPC field to obtain a received TPC command for that finger processor and (2) accumulating the received TPC commands for all finger processors assigned to each base station to obtain the received TPC command for that base station.

TPC detection unit 640 then compares the received TPC commands for each base station against the TPC target value(s) for that base station. Unit 640 provides the detected TPC commands for each base station based on the result of the comparison.

FIG. 6B shows the use of separate UP and DOWN TPC target values to detect the received TPC commands. The horizontal axis represents the possible values for the received TPC commands. The UP TPC target value, $TPC_{target,up,k}$, and the DOWN TPC target value, $TPC_{target,dn,k}$, are marked on the horizontal axis. Each received TPC command is mapped onto the horizontal axis. The detected value for each received TPC command is dependent on where the received TPC command falls in relation to the TPC target values. If inverted polarity is used for the TPC commands, then the detection for each received TPC command may be expressed as:

$$TPC_{det,k} = \begin{cases} \text{DOWN command,} & \text{if } TPC_{rx,k} > TPC_{target,dn,k}, \\ \text{UP command,} & \text{if } TPC_{rx,k} < TPC_{target,up,k}, \\ \text{rejected command,} & \text{otherwise,} \end{cases} \quad \text{Eq (19)}$$

where $TPC_{det,k}$ is the detected TPC command for base station k. As shown in equation (19), the received TPC command is considered unreliable and rejected if it falls in the range between $TPC_{target,up,k}$ and $TPC_{target,dn,k}$ (i.e., if $TPC_{target,dn,k} \geq TPC_{rx,k} \geq TPC_{target,up,k}$).

If a single TPC target value is used, then the UP and DOWN TPC target values may be set as: $TPC_{target,up,k} = TPC_{target,k}$ and $TPC_{target,dn,k} = TPC_{target,k}$. A single TPC target value may be used if no bias is desired in the detection of UP and DOWN commands, so that UP and DOWN commands are equally likely to be rejected. This may be the case, for example, if the terminal is not in soft handover. Two TPC target values may be used, for example, if a bias is desired in the detection of UP and DOWN commands. This may be the case, for example, if the terminal is in soft handover and the DOWN commands have a larger influence in the OR-of-the-DOWN rule. The UP TPC target value may be set to a small negative value or possibly even zero, so that UP commands are less likely to be rejected.

Referring back to FIG. 6A, TPC combiner 650 receives and combines the detected TPC commands for all base stations to provide TPC decisions. TPC combiner 650 implements the OR-of-the-DOWN rule to provide a TPC decision for each slot. TPC combiner 650 discards detected TPC commands for received TPC commands deemed as unreliable. For each slot, TPC combiner 650 provides (1) a DOWN TPC decision if any one of the detected TPC commands is a DOWN command, (2) a rejected TPC decision if all detected TPC commands are rejected commands, or (3) an UP TPC decision otherwise. For each slot, the terminal increases its transmit power for an UP TPC decision, decreases its transmit power for a DOWN TPC decision, and maintains its transmit power otherwise. The TPC detection and combining may also be performed in some other manners.

For the embodiment shown in FIG. 6A, units 612, 614, and 616 may operate whenever pilot estimates are available from the finger processors. The TPC target value(s) for each base station may be computed for each slot, each frame, or some other time interval. To compute the TPC target value(s), only the most recent $(\sqrt{CPICH\_E_c/I_o} \cdot \sqrt{N_t/I_o})_k$ value for each base station is needed from filter 616.

For clarity, pseudo-code for a specific implementation of the detection and combining of received TPC commands is described below. Table 1 lists the variables used for this implementation and their short description.

TABLE 1

| Variable | | Description |
|---|---|---|
| NumFinger | ABS | the number of assigned finger processors |
| NumBS | ABS | the number of base stations being processed |
| i | — | an index used to cycle through all finger processors |
| k | — | an index used to cycle through all base stations |
| NtIo | FP | the $N_t/I_o$ measurement for each finger processor |
| BS_NtIo | BS | the $N_t/I_o$ measurement for each base station |
| filtered_BS_NtIo | BS | the filtered $N_t/I_o$ measurement for each base station |
| sqrt_BS_NtIo | BS | the $\sqrt{N_t/I_o}$ value for each base station |
| Kup | BS | scaling factor used to compute the UP TPC target value |
| Kdn | BS | scaling factor used to compute the DOWN TPC target value |
| up_TPC_target | BS | the TPC target value used to detect for UP commands |

TABLE 1-continued

| Variable | | Description |
|---|---|---|
| dn_TPC_target | BS | the TPC target value used to detect for DOWN commands |
| BS_rxdTPC | BS | the received TPC command for each base station |
| TPC_decision | ABS | TPC decision for all base stations |

BS—variable is maintained for each base station;
FP—variable is maintained for each finger processor;
ABS—variable is maintained for all base stations.

Sum Nt/Io over fingers for each base station (Block 614)

```
10      For (i=0, i<NumFinger, i++) {
20          BS_NtIo[BSindex[i]] += NtIo[i];
30      }
```

// BSindex[i] provides the index of the base station being processed by
// finger processor i.

Filter Nt/Io for each base station with 1-pole IIR filter (Block 616)

```
10      For (k=0, k<NumBS, k++) {
20          Saturate (BS_NtIo[k] to 2^15-1);
30          diff = BS_NtIo[k] - filtered_BS_NtIo[k];
40          filtered_BS_NtIo[k] = Round (diff * IIR_gain);
50      }
```

// The IIR filter has 1 pole, which is defined by IIR_gain.

Compute TPC target values for each base station (Blocks 618 and 620)

```
10      For (k=0, k<NumBS, k++) {
20          Saturate (filtered_BS_NtIo[k] to 2^15-1);
30          sqrt_BS_NtIo[k] = GetSqrt (Filtered_BS_NtIo[k]);
40          up_TPC_target[k] = Kup[k] * sqrt_BS_NtIo[k];
50          dn_TPC_target[k] = Kdn[k] * sqrt_BS_NtIo[k];
60      }
```

// Saturate (x to y) is a function that limits or clips x to a maximum value
// of y. GetSqrt (x) is a function that provides the square root of x.
// The UP and DOWN TPC target values may be stored in a table that can
// be indexed by slot format. For a simple implementation, constant
// values may be used for these TPC target values (i.e., not a function of
// slot format).

Deriving TPC decision for all base station (Blocks 640 and 650)

```
10      TPC_decision = "null";
20      For (k=0, k<NumBS, k++) {
30          If (BS_rxdTPC[k] > dn_TPC_target[k]) {
40              TPC_decision = "DOWN"; }
50          Else If (BS_rxdTPC[k] < up_TPC_target[k]) {
60              If (TPC_decision = "null") TPC_decision = "UP"; }
70      }
```

// TPC decision is set to "null" initially. The OR-of-the-DOWN rule sets
// the TPC decision to DOWN if the received TPC command for any base
// station is detected to be a DOWN command. The TPC decision can
// only be set to UP if a received TPC command is detected to be an UP
// command and no DOWN command has been detected.

Square root implementation (Block 618)

```
10      # define SqrtTableSize 256
20      int SqrtTable [SqrtTableSize];
```

// Create a table where the i-th entry contains a value for 2048 times the
square root of i.

```
30      void CreateSqrtTable ( ) {
40          For (i=0, i< SqrtTableSize, i++) {
50              SqrtTable[i] = (int) floor (sqrt(i)&2048+0.5); }
60      }
```

-continued

```
70      int GetSqrt (int x) {
80          int y = x;
90          int base = 1;
100         If (y < 0) cout << "negative y:" << y << endl;
110         While (y & 0xffffff00) {       // keep shifting right until
120             y = y >> 2;                // y < 256
130             base = base * 2;
140         }
150         If (y >= SqrtTableSize) {
160             cout << "table size exceeded y:" << y << endl; }
170         Return (base * SqrtTable[y]);
180     }
```

// GetSqrt (x) returns a value for 2048 times the square root of x, where x
// is a positive 16-bit number. Steps 110 to 140 shifts y to the right until
// y < 256. At the end of the shifting: base = 1 if x = 1..255; base = 2 if
// x = 256..1023; base = 4 if x=1024..4095; ...;
// and base = 16 if x=2^14..2^15-1.

FIG. 7A shows an embodiment of a process 700 for determining the reliability of TPC commands received from a transmitter (e.g., a base station) in a wireless communication system (e.g., a CDMA system). At least one TPC target value is determined based on a TPC threshold and possibly a weight, as described above (step 712). Multiple TPC target values may be computed and used to detect for UP commands and DOWN commands, as described above. The received TPC commands are compared against the TPC target value(s) (step 714). A detected TPC command is provided for each received TPC command based on the result of the comparison (step 716). Each detected TPC command is a DOWN command, an UP command, or a rejected command, as shown in equation (19).

FIG. 7B shows an embodiment of a process 750 for combining TPC commands received from multiple transmitters in a wireless communication system. At least one TPC target value is determined for each transmitter based on a TPC threshold and possibly a weight for the transmitter (step 752). The TPC target value(s) for each transmitter may be determined as described above. The received TPC commands for each transmitter are compared against the TPC target value(s) for that transmitter to obtain detected TPC commands for the transmitter (step 754). The detected TPC commands for the multiple transmitters are then combined to provide TPC decisions (step 756). Detected TPC commands for unreliably received TPC commands are discarded. The OR-of-the-DOWN rule may be applied to the detected TPC commands for each power control period to obtain a TPC decision for that power control period, as described above.

Various schemes may also be implemented in combination with the techniques described above. Some of these schemes are described below.

In a first scheme, a power lock threshold is maintained for each assigned finger processor and used to accept or reject the received TPC commands for that finger processor. The power lock threshold may be computed based on an average DPCCH $E_c/N_t$, the $E_c/N_t$ of any DPCCH field including TPC $E_c/N_t$, CPICH $E_c/I_o$, or some other $E_c/I_t$ or $E_c/I_o$ measurement. For W-CDMA, the TPC, TFCI, and dedicated pilot (see FIG. 2A) may be transmitted at different power levels. Thus, the average DPCCH $E_c/N_t$ may be different from the TPC $E_c/N_t$. The power lock threshold for each finger processor may be set, for example, to the measurement for the finger processor with the strongest multipath minus an offset (e.g., a few dB). If this value is less than a minimum threshold value (e.g., −20 or −17.5 dB), then the power lock threshold may be set to the minimum threshold value. The power lock threshold for the strongest finger processor may be set to the minimum threshold value.

If the measurement for a given finger processor is less than the power lock threshold for that finger processor, then the received TPC commands for that finger processor are discarded and not used for power control. The use of a power lock threshold based on DPCCH $E_c/N_t$ or TPC $E_c/N_t$ may result in some finger processors assigned to a "good" base station being combined even though the CPICH $E_c/I_o$ for these finger processors may be weak. This scenario is more likely to occur if power balancing is not applied for soft handover, and the ratio between DPCCH power to CPICH power varies across multiple base stations in the active set.

In a second scheme, a power lock threshold is maintained for each base station and used to accept or reject the received TPC commands for that base station. The power lock threshold may be computed based on DPCCH $E_c/N_t$, TPC $E_c/N_t$, CPICH $E_c/I_o$, or some other $E_c/N_t$ or $E_c/I_o$ measurement. The measurement for each base station may be determined by combining the measurements for all finger processors assigned to process that base station. The power lock threshold for each base station may be determined by the measurement for the strongest received base station minus an offset (e.g., a few dB). If the measurement for a given base station is less than the power lock threshold for that base station, then the received TPC commands for that base station are discarded.

In a third scheme, the received powers for the DPCCH and CPICH are estimated for each base station, and the ratio of DPCCH power to CPICH power is computed. The DPCCH to CPICH power ratios for all base stations in the active set are then compared to detect for power imbalance. Power imbalance may be declared, for example, if the largest power ratio is greater than X times the smallest power ratio, where X is a value greater than one. If power imbalance is not declared, then the received TPC commands may be accepted or rejected based on pilot signal strength (i.e., received power for the CPICH). Otherwise, if power imbalance is declared, then the techniques described above may be used to determine the reliability of individual received TPC commands and to combine these received TPC commands.

In a fourth scheme, only the received TPC commands for the strongest received base station are used for power control. The received TPC commands for all other base stations are discarded. For this scheme, no TPC combining is performed. The received TPC commands for the strongest received base station may be accepted or rejected using the techniques described above.

The techniques described herein can more accurately determine the reliability of received TPC commands. These techniques may be advantageously used by/for terminals that are in soft handover as well as those that are not in soft handover.

The techniques described herein may be used for any closed-loop power-controlled wireless communication system that sends TPC commands to control transmit power. For example, these techniques may be used for CDMA systems such as W-CDMA, IS-95, IS-2000, and IS-856 systems. Different systems may send TPC commands in different manners, using different channel structures, and so on. Moreover, the TPC commands for different systems may have different formats and/or different polarity than those described above for W-CDMA. The number of TPC target values to use and the values for these TPC target values may then be dependent on the format and polarity used for the TPC commands.

The techniques described herein may be implemented by various means. For example, these techniques may be implemented in hardware, software, or a combination thereof. For a hardware implementation, the processing units for these techniques (e.g., TPC processor 364) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the techniques described herein may be implemented with modules (e.g., procedures, functions, and so on) that perform the functions described herein. The software codes may be stored in a memory unit (e.g., memory unit 322 or 362 in FIG. 3) and executed by a processor (e.g., controller 320 or 360). The memory unit may be implemented within the processor or external to the processor, in which case it can be communicatively coupled to the processor via various means as is known in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A device in a wireless communication system, comprising:
   a computation unit operative to determine a transmit power control (TPC) target value based on at least one measurement for a base station, the TPC target value being used for determining reliability of received TPC commands and for detection of the received TPC commands; and
   a detection unit operative to perform detection of the received TPC commands by considering the reliability of the received TPC commands, to compare the received TPC commands against the TPC target value, and to provide detected TPC commands based on results of the comparison.

2. The device of claim 1, wherein the detection unit is operative to provide a detected TPC command for each of the received TPC commands, and wherein the detected TPC command indicates that the received TPC command is unreliable when an absolute value of the received TPC command is less than the TPC target value.

3. The device of claim 1, wherein the TPC target value is determined based on a TPC threshold.

4. The device of claim 3, wherein the TPC threshold is a function of signal-to-interference ratio (SIR) for the received TPC commands.

5. The device of claim 3, wherein the TPC threshold is a function of energy-per-chip-to-total-incoming-signal ratio ($E_c/I_o$) for a pilot and signal-to-interference ratio (SIR) for the received TPC commands.

6. The device of claim 3, wherein the TPC threshold is a function of energy-per-chip-to-total-noise-and-interference ratio ($E_c/N_t$) for a transmission received along with the received TPC commands.

7. The device of claim 3, wherein the TPC threshold is selected based on a tradeoff between probability of false alarm and probability of missed detection.

8. The device of claim 3, wherein the TPC target value is further determined based on a weight.

9. The device of claim 8, wherein the weight is a weighted total-noise-and-interference-to-total-incoming-signal ratio ($N_t/I_o$) estimate for the base station.

10. The device of claim 9, wherein the computation unit is operative to determine a weighted $N_t/I_o$ estimate for each of a plurality of signal instances for the base station and to sum a plurality of weighted $N_t/I_o$ estimates for the plurality of signal instances to obtain the weight.

11. The device of claim 1, wherein the computation unit is operative to provide first and second TPC target values, wherein the first TPC target value is used to determine whether the received TPC commands are UP commands, and wherein the second TPC target value is used to determine whether the received TPC commands are DOWN commands.

12. The device of claim 11, wherein the first and second TPC target values are determined based on first and second scaling factors, respectively.

13. The device of claim 1, wherein the wireless communication system is a Code Division Multiple Access (CDMA) system.

14. An integrated circuit, comprising:
a computation unit operative to determine a transmit power control (TPC) target value based on at least one measurement for a base station, the TPC target value being used for determining reliability of received TPC commands and for detection of the received TPC commands; and
a detection unit operative to perform detection of the received TPC commands by considering the reliability of the received TPC commands, to compare the received TPC commands against the TPC target value, and to provide detected TPC commands based on results of the comparison.

15. An apparatus in a wireless communication system, comprising:
means for determining a transmit power control (TPC) target value based on at least one measurement for a transmitter, the TPC target value being used for determining reliability of received TPC commands and for detection of the received TPC commands;
means for performing detection of the received TPC commands by considering the reliability of the received TPC commands and comparing the received TPC commands against the TPC target value; and
means for providing a detected TPC command for each of the received TPC commands based on a result of the comparison, wherein the detected TPC command indicates that the received TPC command is unreliable when an absolute value of the received TPC command is less than the TPC target value.

16. A method of determining reliability of transmit power control (TPC) commands received from a transmitter in a wireless communication system, comprising:
determining a TPC target value based on at least one measurement for the transmitter, the TPC target value being used for determining reliability of received TPC commands and for detection of the received TPC commands;
performing detection of the received TPC commands by considering the reliability of the received TPC commands and comparing the received TPC commands against the TPC target value; and
providing a detected TPC command for each of the received TPC commands based on a result of the comparison, wherein the detected TPC command indicates that the received TPC command is unreliable when an absolute value of the received TPC command is less than the TPC target value.

17. The method of claim 16, wherein the determining includes
obtaining a weighted total-noise-and-interference-to-total-incoming-signal ratio ($N_t/I_o$) estimate for the transmitter, and
obtaining the TPC target value based on the weighted $N_t/I_o$ estimate and a TPC threshold.

18. The method of claim 17, wherein the weighted $N_t/I_o$ estimate is computed for each of a plurality of signal instances for the transmitter, and wherein a plurality of weighted $N_t/I_o$ estimates for the plurality of signal instances are summed and used to obtain the TPC target value.

19. A processor readable media including instructions operable in a wireless communication device to:
determine a transmit power control (TPC) target value based on at least one measurement for a base station, the TPC target value being used for determining reliability of received TPC commands and for detection of the received TPC commands;
perform detection of the received TPC commands by considering the reliability of the received TPC commands and comparing the received TPC commands against the TPC target value; and
provide a detected TPC command for each of the received TPC commands based on a result of the comparison, the detected TPC command indicating that the received TPC command is unreliable when an absolute value of the received TPC command is less than the TPC target value.

20. A device in a wireless communication system, comprising:
a computation unit operative to provide a plurality of transmit power control (TPC) target values for a plurality of transmitters based on measurements for the plurality of transmitters, the TPC target value for each transmitter being used for determining reliability of received TPC commands for the transmitter and for detection of the received TPC commands;
a detection unit operative to perform detection of the received TPC commands for each transmitter by considering the reliability of the received TPC commands for the transmitter, to compare the received TPC commands for each transmitter against the TPC target value for the transmitter, and to provide detected TPC commands for the transmitter; and
a TPC combiner operative to combine detected TPC commands for the plurality of transmitters to provide TPC decisions.

21. The device of claim 20, wherein the detection unit is operative to provide a detected TPC command for each received TPC command, and wherein the detected TPC command indicates that the received TPC command is unreliable when an absolute value of the received TPC command is less than the TPC target value used for the received TPC command.

22. The device of claim 21, wherein the TPC combiner is operative to discard detected TPC commands for received TPC commands deemed as unreliable.

23. The device of claim 20, wherein the detection unit provides a plurality of detected TPC commands for the plurality of transmitters for each power control period, and wherein the TPC combiner is operative to provide a TPC decision to decrease transmit power if any one of the plurality of detected TPC commands for the power control period indicates a decrease in transmit power.

24. The device of claim 20, wherein the TPC target value for each of the plurality of transmitters is determined based on a TPC threshold and a weight for the transmitter.

25. The device of claim 24, wherein the weight for each of the plurality of transmitter is a weighted total-noise-and-interference-to-total-incoming signal ratio ($N_t/I_o$) estimate for the transmitter.

26. The device of claim 20, further comprising:
a symbol combiner operative to combine data symbol estimates for at least one signal instance for each transmitter to provide the received TPC commands for the transmitter.

27. The device of claim 20, wherein the TPC combiner is operative to discard detected TPC commands for any one of the plurality of transmitters when a signal quality estimate for the transmitter is below a predetermined threshold.

28. The device of claim 27, wherein the signal quality estimate is an energy-per-chip-to-total-noise-and-interference ratio ($E_c/N_t$) estimate for a physical channel used to send the received TPC commands.

29. The device of claim 27, wherein the signal quality estimate is an energy-per-chip-to-total-noise-and-interference ratio ($E_c/N_t$ estimate for the received TPC commands.

30. The device of claim 20, wherein the wireless communication system is a Code Division Multiple Access (CDMA) system.

31. An integrated circuit in a wireless communication system, comprising:
a computation unit operative to determine a plurality of transmit power control (TPC) target values for a plurality of transmitters based on measurements for the plurality of transmitters, the TPC target value for each transmitter being used for determining reliability of received TPC commands for the transmitter and for detection of the received TPC commands;
a detection unit operative to perform detection of the received TPC commands for each transmitter by considering the reliability of the received TPC commands for the transmitter, to compare received TPC commands for each transmitter against the TPC target value for the transmitter, and to provide detected TPC commands for the transmitter; and
a TPC combiner operative to combine detected TPC commands for the plurality of transmitters to provide TPC decisions.

32. An apparatus in a wireless communication system, comprising:
means for determining a plurality of transmit power control (TPC) target values for a plurality of transmitters based on measurements for the plurality of transmitters, the TPC target value for each transmitter being used for determining reliability of received TPC commands for the transmitter and for detection of the received TPC commands;
means for performing detection of the received TPC commands for each transmitter by considering the reliability of the received TPC commands for the transmitter and comparing received TPC commands for each of the plurality of transmitters against the TPC target value for the transmitter to provide detected TPC commands for the transmitter; and
means for combining detected TPC commands for the plurality of transmitters to provide TPC decisions.

33. A method of combining transmit power control (TPC) commands received in a wireless communication system, comprising:
determining a plurality of TPC target values for a plurality of transmitters based on measurements for the plurality of transmitters, the TPC target value for each transmitter being used for determining reliability of received TPC commands for the transmitter and for detection of the received TPC commands;
performing detection of the received TPC commands for each transmitter by considering the reliability of the received TPC commands for the transmitter and comparing received TPC commands for each of the plurality of transmitters against the TPC target value for the transmitter to provide detected TPC commands for the transmitter; and
combining detected TPC commands for the plurality of transmitters to provide TPC decisions.

34. The device of claim 22, wherein the TPC combiner is operative to combine undiscarded detected TPC commands based on an OR-of-the-DOWN rule.

* * * * *